FLOW METERING AND DIVIDING DEVICE

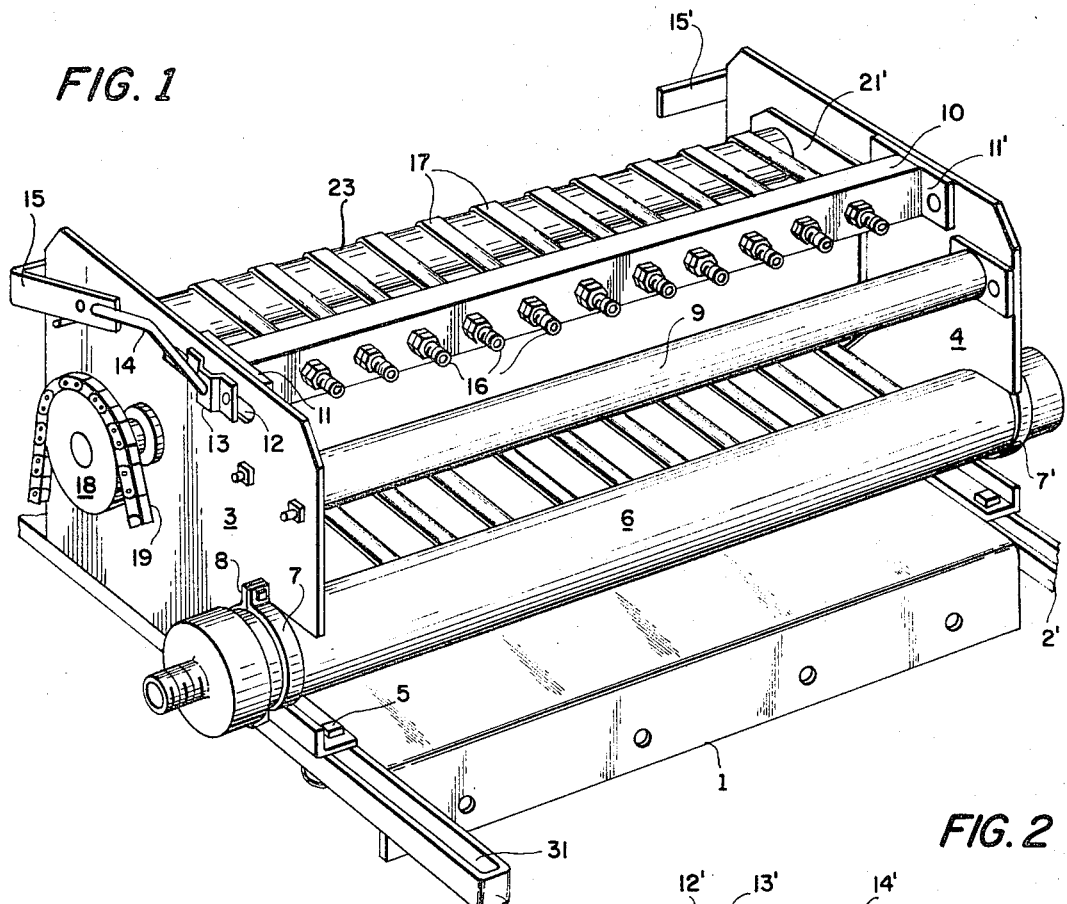
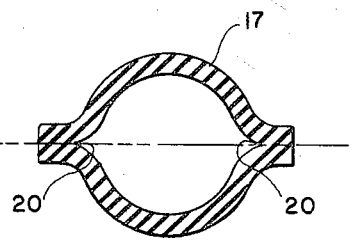
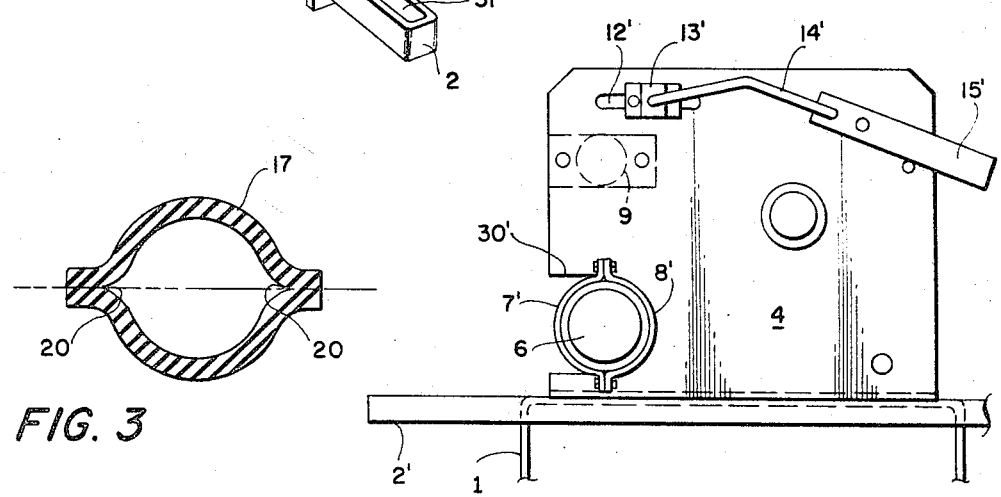
INVENTOR
LAWRENCE N. TANGEMAN
BY Gene D. Watson
ATTORNEY Oct. 1, 1968          L. N. TANGEMAN          3,403,631

Filed March 28, 1967          2 Sheets-Sheet 2

INVENTOR

LAWRENCE N. TANGEMAN

BY *Gene D. Watson*

ATTORNEY

United States Patent Office 3,403,631
Patented Oct. 1, 1968

3,403,631
FLOW METERING AND DIVIDING DEVICE
Lawrence N. Tangeman, Beatrice, Nebr., assignor to Dempster Industries, Inc., Beatrice, Nebr., a corporation of Nebraska
Filed Mar. 28, 1967, Ser. No. 626,620
10 Claims. (Cl. 103—149)

ABSTRACT OF THE DISCLOSURE

A rotary compress type liquid meter wherein moving rollers meter liquid flow through resilient hoses which are tensioned around the rollers to be closed by the moving rollers. Several hoses extend from an inlet manifold so that liquid from the manifold is divided among and metered through the hoses, which are specially configured in cross-section so as to be easily closed. An outlet manifold member is adjustable by an over-center lever or equivalent mechanism to tension the hoses, and is adjustable relative to the over-center lever to compensate for permanent hose stretch. The manifolds and hoses are easily removable and replaceable as an assembly.

Field of the invention

The invention relates to metering liquids to several outlets through individual hoses which are controlled by rollers which move along and progressively close the hoses, thus regulating the rate of liquid flow therethrough by the speed of movement of the rollers. The invention is particularly useful in dispensing liquid fertilizer on cropland, for instance, simultaneously to several adjacent rows.

Description of the prior art

The general principle of passing liquid from an inlet manifold through roller-actuated hoses is not new, since this has been accomplished in a manner in the prior art by hose pumps, such as those disclosed in U.S. Patent No. 2,406,485 to Arnold and U.S. Patent No. 2,913,992 to Blue et al., in which the inventor of the instant invention appeared as a joint inventor. In many of these hose pumps, the hoses were configured so as to require very substantial stresses to close the hoses, and the hose material was often of a type which would take set or loss of memory in a relatively short time when so stressed. In many of these hose pumps the hoses were compressed between rollers and various types of backing plates to effect closure of the hoses, and this tended to shorten the lives of the hoses because of the severe flattening and compression. Also, in such pumps with backing plates, a slight difference in hose thickness among the several hoses would often result in a smaller or thinner hose not closing completely because of the greater thickness of an adjacent hose or hoses. Many of these hose pumps did not provide tension release arrangements to relax the hoses during nonuse, and even where this was possible, the means provided were usually not easily adjusted or adjustable. The same holds true for a further desirable adjustment to compensate for stretch in the hoses independently of the tensioning and relaxing arrangement. Other such pumps did not provide for or permit easy change of hoses or disassembly of the mechanism, or the use of different sized hoses simultaneously so as to vary the division of flow in substantially any desired manner. In addition to the above mentioned two patents, U.S. Patents No. 3,122,103 and No. 3,079,868 to Ormsby are further exemplary of previously patented hose pumps which embody some of the general principles of the flow meter and divider of the instant invention.

Summary of the invention

It is the principal object of the instant invention to provide an improved device for metering liquid flow through a flexible hose and preferably for dividing the liquid flow from an inlet manifold among a plurality of such hoses, which may be so sized and configured as to effect the division in the desired proportions.

In keeping with this object, and toward avoiding or minimizing the disadvantages of many of the previously patented devices, most of which were constructed as hose pumps, a device in accordance with the instant invention preferably is so constructed that the hoses pass around the roller or rotor assembly clear of other parts of the device, so that the hoses contact only the rotor assembly between their ends, and the closure of the hoses by the rollers is caused by tension the hoses. To effect such tensioning, at least one of the manifolds or manifold members to which the hoses are connected is mounted for movement in directions generally away from and toward the rotor assembly so as to permit tensioning of the hoses around the rotor assembly or relaxation of the hoses, depending upon the direction of movement. Means are provided for selectively moving the movable manifold in a tensioning or relaxing direction and for locking or holding the manifold in the tensioning position. In a preferred embodiment, the means for moving the movable manifold comprises an over-center lever means carried by at least one of the side walls of the device and operatively connected to the movable manifold. To permit easy and convenient compensation for any permanent stretch which may develop in the hoses after long periods of use, the device preferably is further arranged to permit relative adjustment between the movable manifold and the over-center lever mechanism or equivalent mechanism. The hoses preferably are specially configured in cross section so as to be easily flattened when tensioned around the rotor assembly, thus prolonging the life of the hoses and lessening the power requirement for operating the metering and dividing device. Preferably the outlet manifold member is the movable manifold, and extends between the interior surfaces of the side walls of the device so as to be easily movable and removable. The inlet manifold preferably is mounted in similar slots which extend inwardly from the edges of the two side walls, thus facilitating removal also of the inlet manifold, and in turn facilitating removal of both manifolds and the connecting hoses as an integral assembly. This in turn facilitates the mounting of such assemblies with perhaps different sized hoses when a different metering or dividing operation is desired. The device is easily driven through a chain drive arrangement, and toward controlling the tension in the chain drive, the device preferably is arranged for mounting on a support structure, and is further arranged to permit adjustment of the side walls and parts carried thereby relative to the fixed mounting.

A device constructed in accordance with the preferred embodiment of the invention constitutes, in essence, a gravity feed control. Such a device will not operate against any appreciable head, nor will it efficiently draw from a negative head, and the liquid undergoes no appreciable change in pressure in passing through a meter constructed in accordance with the preferred embodiment.

Other and further objects, advantages and features of the invention will be apparent to those skilled in the art and armed with an understanding of the invention. I have set forth with particularity and distinctness in the appended claims those novel features and combinations of features which I consider to be characteristic of my invention, but the invention itself, its operation, its advantages, and its possibilities will be best apparent to those skilled in the art from the following description of a preferred embodiment of the invention, taken with reference to the accompanying drawings.

Description of the drawings

FIGURE 1 is a perspective view of a preferred embodiment of the invention.

FIGURE 2 is a side view in elevation of the embodiment shown in FIGURE 1.

FIGURE 3 is a cross section showing the preferred configuration of the hoses to be used in the preferred embodiment.

Description of the preferred embodiment

Figure 4:
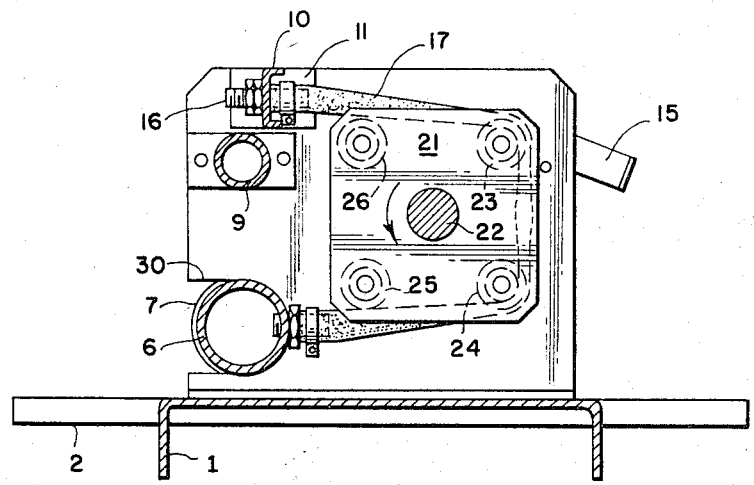
FIGURE 4 is a side elevation view similar to FIGURE 2, but in section, illustrating the inner components between the two side walls.

Referring to FIGURES 1, 2 and 4 of the drawings, connected to a main mounting plate 1 are rail-like members 2 and 2', in which are formed adjusting slots 31. The main mounting plate 1 has bolt holes formed therein to facilitate mounting the entire device on a structure such as an agriculture machine, and accordingly the mounting plate can take various forms. Slidably mounted on the slotted members 31 are two side walls 3 and 4, these side walls being slidably connected to the members 2 and 2' by bolts 5 which pass through the slots 31, thus permitting sliding adjustment of the side walls 3 and 4 back and forth along the rails 2 and 2'. Suitable connecting members such as shown at 9 interconnect the side walls 3 and 4 so as to form a rigid frame structure.

The side walls 3 and 4 have similar slots 30 and 30' formed therein to removably receive an inlet manifold 6 which is to be connected to the main supply of liquid. Clamping members 7, 7', 8 and 8' removably hold the inlet manifold 6 in the slots, clamps 8 and 8' being rigidly connected to the side walls 3 and 4.

An outlet manifold member 10 is formed with flanges 11 and 11' at its ends, and extends between the side walls 3 and 4. The outlet manifold member 10 is slidable back and forth relative to the side walls in slots 12 and 12' so as to permit tensioning or relaxing of the hoses, as will appear more fully hereinafter.

A main drive shaft 22 extends between and through the respective side walls and is journalled therein. The drive shaft 22 has rotor assembly plates 21 and 21' mounted thereon at opposite ends to rotate with the drive shaft. Extending between these plates 21 and 21', and rotatably journalled therein, are four rollers 23-26, the rollers being disposed radially outwardly of the drive shaft 22 and circumferentially spaced from each other as shown.

A plurality of flexible hoses 17 are connected at their ends to the inlet manifold 6 and to individual outlet members 16 extending through and carried by the outlet manifold member 10, and extend around the rotor assembly plates 21 and 21' and the rollers carried thereon, as best illustrated in FIGURE 4. The outlet members 16 preferably are not rigidly connected to the manifold 10, such as by welding, but rather are constructed so as to be rotatable about their axes to avoid torsional stressing of the hoses. As illustrated, the threaded male outlet members pass through holes in the manifold member 10 and are retained therein by the threaded nuts on the side of the manifold member away from the hoses, thus enabling the outlets to rotate about their axes to correct any hose twist or the like. These hoses are of a length such that they can be tensioned around the rollers when the outlet manifold member 10 is moved in one direction and relaxed when the manifold member 10 is moved in the other direction, and the tension need be only such as to close or flatten the hoses at the points where they are progressively contacted by one of the rollers 23-26. As shown in FIGURE 1, the main drive shaft 22 has a sprocket 18 connected at one end to be driven by a chain drive 19, which in turn is driven by a conventional drive arrangement on the particular machine upon which the device is mounted.

Figure 5:
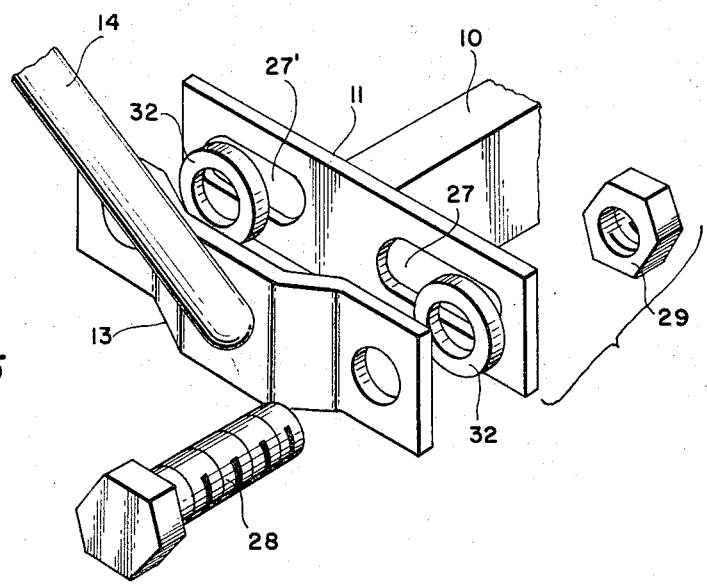
FIGURE 5 is a detailed fragmentary view showing the connection between the over-center lever and the movable manifold, and also illustrating the arrangement whereby the movable manifold can be adjusted independently of the over-center lever to compensate for any permanent stretch in the hoses.

An over-center lever mechanism, consisting of levers 15 and 15' and connecting links 14 and 14', is mounted on each side wall for effecting tensioning or relaxing movement of the manifold member 10 back and forth in the slots 12 and 12'. The connecting links 14 and 14' are movably connected at their ends to members 13 and 13', as shown most clearly in FIGURE 5. As shown in FIGURE 5, the flanges 11 and 11' have elongated slots 27 and 27' formed therein to receive bolts 28 which pass through bolt holes formed in members 13 and 13' and slots 12 and 12' in the side walls 3 and 4. Spacer members 32, through which bolts 28 also pass, are interposed between members 13 and flange 11 and members 13' and flange 11', respectively, and are of a size to permit them to slide back and forth in the slots 12 and 12', thus permitting, for instance, member 13 and flange 11 to be connected together rigidly by bolts 28 and nuts 29 while still permitting relatively easy sliding movement of the entire outlet manifold assembly back and forth along the slots 12 and 12' when the over-center levers are actuated. Thus the manifold member 10, its end flanges 11 and 11', and the members 13 and 13' can be moved back and forth along the slots 12 and 12' as a unit to effect tensioning or relaxing of the hoses 17, and additionally the manifold member 10 and its flanges 11 and 11' can be further adjusted relative to the over-center lever mechanism and the members 13 and 13' simply by loosening the nuts 29 on the bolts 28. This further adjustment can be in either direction and to an extent governed by the lengths of the slots 27 and 27'. This further adjustment feature is most useful in compensating for permanent stretch in the hoses 17 without in any manner varying the tensioning or relaxing effectiveness of the overcenter lever mechanism. Furthermore, to permit variation of the "wrap" of the hoses around the rollers, additional openings corresponding to 27, 27' can be formed in flanges 11, 11' above and/or below 27, 27' to permit vertical adjustment of manifold member 10 (as viewed in FIG. 4). For instance, a downward adjustment would give more "wrap" so as to prevent internal leakage or "bleed" through the hoses when there is a high suction head pressure.

The nature of the over-center lever mechanism is, of course, such that it effectively locks the manifold member 10 in the hose-tensioning position.

The operation of the device will be apparent from the foregoing description. Liquid is supplied under gravity flow to the inlet manifold. After the over-center levers are actuated to tension the hoses around the rotor assembly, rotation of the rotor assembly with the four rollers in the direction indicated by the arrow in FIGURE 4 results in trapping a small amount of liquid in each hose between the two lower rollers. As these progress around the inside of the hoses, this liquid is carried on and discharged through the individual outlets in the outlet manifold member. The metering rate can be varied at will by varying the rotational speed of the rotor assembly. During periods of nonuse, the hoses are completely relaxed by operating the over-center levers to move the outlet manifold member along the slots 12 and 12' toward the rotor assembly. Using identical hoses, the flow rate from the individual outlets is substantially equal. However, hoses of different sizes can be used simultaneously so as to obtain larger metered flows from certain outlets. Should the hoses assume a permanent stretch after substantial use, this can be compensated for simply by loosening the nuts 29 on the bolts 28, and adjusting the outlet manifold member 10 to the right as viewed in FIGURE 5 relative to the over-center lever mechanism and the individual members 13 and 13'. Since the hoses are not closed by compressing them against a backing plate, the presence of one or more relatively thicker hoses will not prevent the proper closure of the thinner hoses, and accordingly the hoses need not be of exactly uniform thickness.

As shown in FIGURE 3, the preferred cross sectional configuration of the hoses is such as to permit flattening with little stress and accordingly with relatively little energy put into the hose, thus requiring less power and prolonging hose life. As shown in FIGURE 3, the hose has a cross secton, considered relative to a horizontal center line therethrough which would be parallel to the axis of the rotor assembly, such that the inner wall on each side of the center line curves inwardly toward the center line from a region of maximum diameter and becomes substantially parallel to the center line before merging therewith, thus terminating in sharp points 20 on the center line at opposite ends of the region of maximum diameter. The outer wall surface is substantially parallel to the inner wall over the circumference of the hose. The hose material preferably is a Neoprene compound which is very resilient and reforms to its original shape rapidly. It can be flattened completely several million times without loss of metering characteristics. The material is soft enough (approximately 55 durometer preferred) that it can be clamped onto a cylindrical hose barb with no leakage. As previously mentioned, the points 20 should be as sharp as possible.

It is important that the entire hose assembly with the inlet manifold and the outlet manifold member is removed easily, and in the preferred embodiment this requires only the removal of clamps 7 and 7' and bolts 28 and 29. This facilitates the replacement of an entire assembly by a new assembly of either the same or different sized hoses, and also greatly facilitates the replacement of an individual hose in the field if necessary.

While the over-center lever mechanism is the preferred mechanism for tensioning and relaxing the hose, other mechanisms can be used. For instance, the device could incorporate lever-mounted cams mounted on the side wall for bearing against either the outlet manifold member or a projection therefrom through the slots 12 and 12' to move the outlet manifold member to a hose-tensioning position. Simple locking detents conveniently could be incorporated to hol dthe cams and their levers in the hose-tensioning position.

The preferred embodiment is susceptible of numerous other variations and modifications without departing from the scope and spirit of the invention, and accordingly it should be understood that the preferred embodiment disclosed and illustrated herein is merely exemplary of the invention, and that the scope of the invention itself is as defined in the subjoined claims.

I claim:

1. A device for metering liquid from an inlet manifold to at least one outlet, comprising a frame having two spaced side walls; an inlet manifold extending between and carried by said side walls; an outlet manifold member extending between and carried by said side walls; a rotor assembly extending between and journalled in said side walls, said rotor assembly having a plurality of circumferentially spaced rollers disposed radially outwardly from the axis of the rotor assembly and movable about the axis thereof upon rotation of the rotor assembly, the axes of the rollers being parallel to the axis of the rotor assembly, said rotor assembly being offset relative to a line between said inlet manifold and said outlet manifold member; at least one flexible hose member connected at one end to said inlet manifold to receive liquid therefrom and connected at its other end to said outlet manifold member as an individual outlet therefrom, and extending from the inlet manifold around the rotor assembly to the outlet manifold member with substantial clearance between the hose and other parts of the device, so as to contact only the rotor assembly between its ends; means mounting at least one of the inlet manifold and the outlet manifold members for movement in directions generally away from and toward said rotor assembly so as to permit tensioning of said hose around said rotor assembly or relaxation of said hose, depending upon the direction of movement; and means for selectively moving the movable manifold away from or toward said rotor assembly so as to tension or relax said hose and for holding the movably mounted manifold in the position in which said hose is tensioned around said rotor assembly and is stressed solely by said tensioning, whereby upon rotation of said rotor assembly when said hose is under tension liquid flow can be metered from said inlet manifold through said hose to said inlet manifold member at a rate determined by the speed of rotation, and said hose can be selectively relaxed by actuating said means for selectively moving the movable manifold.

2. A device as claimed in claim 1 wherein a plurality of hoses of substantially equal length are connected to said inlet manifold and said outlet manifold member and extend around said rotor assembly in adjacent parallel paths so as to be tensioned and relaxed simultaneously upon movement of said movable manifold, whereby liquid flow from the inlet manifold will be divided among and metered through the separate hoses upon rotation of said rotor assembly when said hoses are tensioned.

3. A device as claimed in claim 2 wherein said means for selectively moving said manifold comprises over-center lever means carried by at least one of said side walls and operatively connected to said movable manifold for moving said movable manifold away from the rotor assembly and locking it in a hose-tensioning position.

4. A device as claimed in claim 3 further comprising means mounting said movable manifold for adjustment relative to said over-center lever means so as to permit adjustment of the movable manifold independently of the over-center lever means to compensate for permanent stretch in the hoses where necessary.

5. A device as claimed in claim 1 further comprising means mounting said movable manifold for adjustment relative to said means for selectively moving said manifold.

6. A device as claimed in claim 2 wherein each of said hoses has a cross section, considered relative to a center line therethrough parallel to the axis of said rotor assembly, such that the inner wall on each side of the center line curves inwardly toward the center line from a region of maximum diameter and becomes substantially parallel to the center line before merging therewith, thus terminating in sharp points on the center line at opposite ends of the region of maximum diameter, the outer wall being substantially parallel to the inner wall over at least most of the circumference of the hose, whereby the hoses may be flattened easily with very little compressive stress.

7. A device as claimed in claim 2 wherein the movable manifold is the outlet manifold member, and the respective side walls of the frame have similar slots formed therein extending inwardly from the edges thereof, said inlet manifold being removably mounted in said slots, whereby the inlet manifold, the outlet manifold member and the hoses connected thereto may be easily removed as an integral assembly.

8. A device as claimed in claim 2 further comprising mounting means for mounting the entire device fixedly on a support structure, and means mounting the side walls and parts carried thereby for adjustable movement relative to said mounting means for the entire device.

9. A device as claimed in claim 2 wherein the movable manifold is the outlet manifold member, and said means for moving the outlet manifold member comprises a lever mounted on at least one of said side walls and a mechanical linkage extending between said lever and said outlet manifold member for moving the outlet manifold member in response to actuation of said lever.

10. A device as claimed in claim 9 further comprising means mounting said outlet manifold for adjustment toward and away from said rotor assembly relative to said lever.

References Cited

UNITED STATES PATENTS

| | | | |
|---|---|---|---|
| 2,406,485 | 8/1946 | Arnold | 103—149 |
| 2,885,967 | 5/1959 | Vogel et al. | 103—149 |
| 2,911,827 | 11/1959 | Hanks | 103—149 |
| 2,913,992 | 11/1959 | Blue et al. | 103—149 |
| 3,079,868 | 3/1963 | Ormsby | 103—149 |
| 3,122,103 | 2/1964 | Ormsby | 103—149 |
| 3,172,367 | 3/1965 | Kling | 103—149 |

FOREIGN PATENTS

| | | |
|---|---|---|
| 467,288 | 6/1937 | Great Britain. |

FRED C. MATTERN, Jr., *Primary Examiner.*

WILBUR J. GOODLIN, *Assistant Examiner.*